H. V. JOBE.
COTTON CHOPPING MACHINE.
APPLICATION FILED MAR. 17, 1913.
1,135,287.
Patented Apr. 13, 1915.
2 SHEETS—SHEET 1.
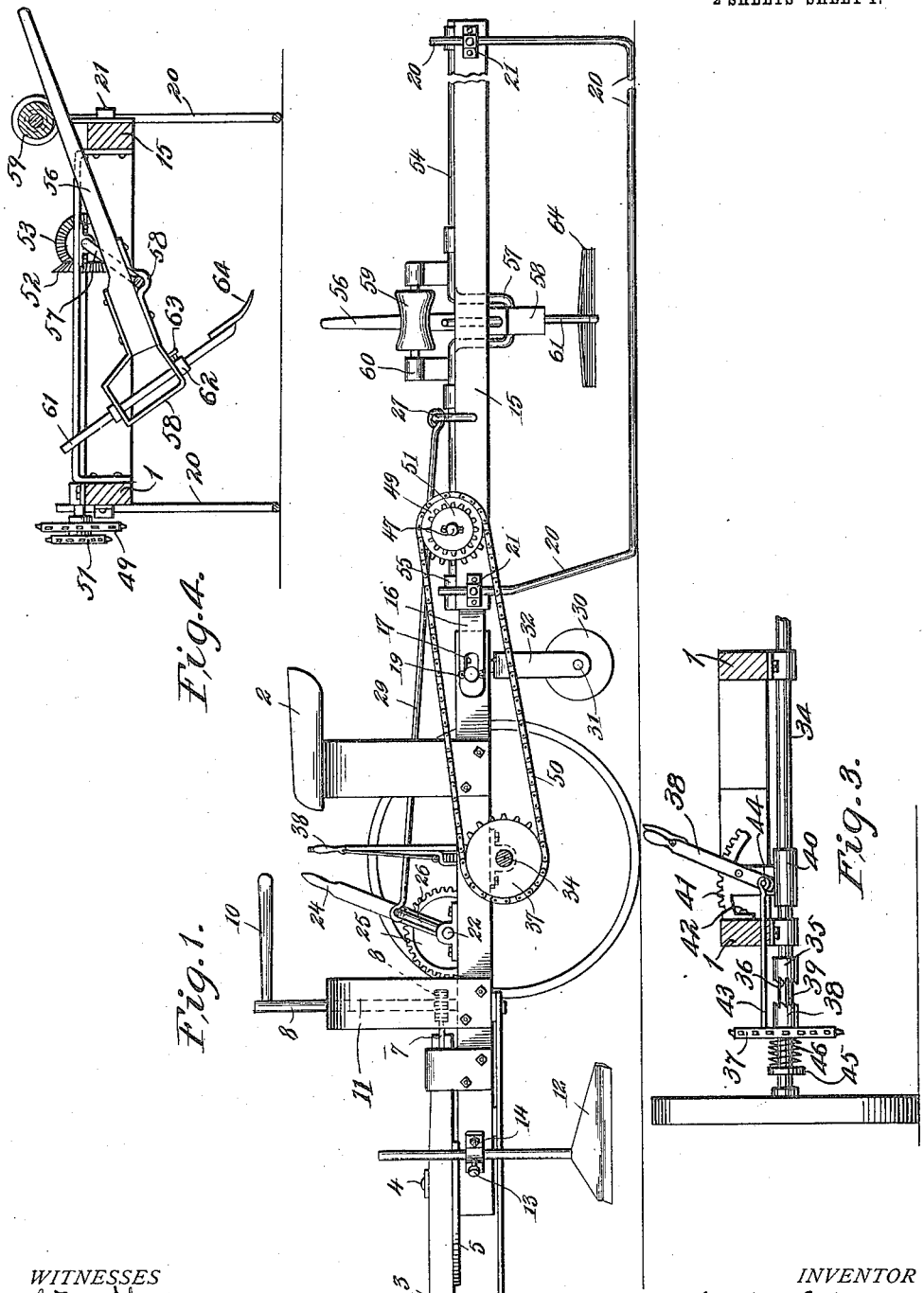
WITNESSES
INVENTOR
his Attorney

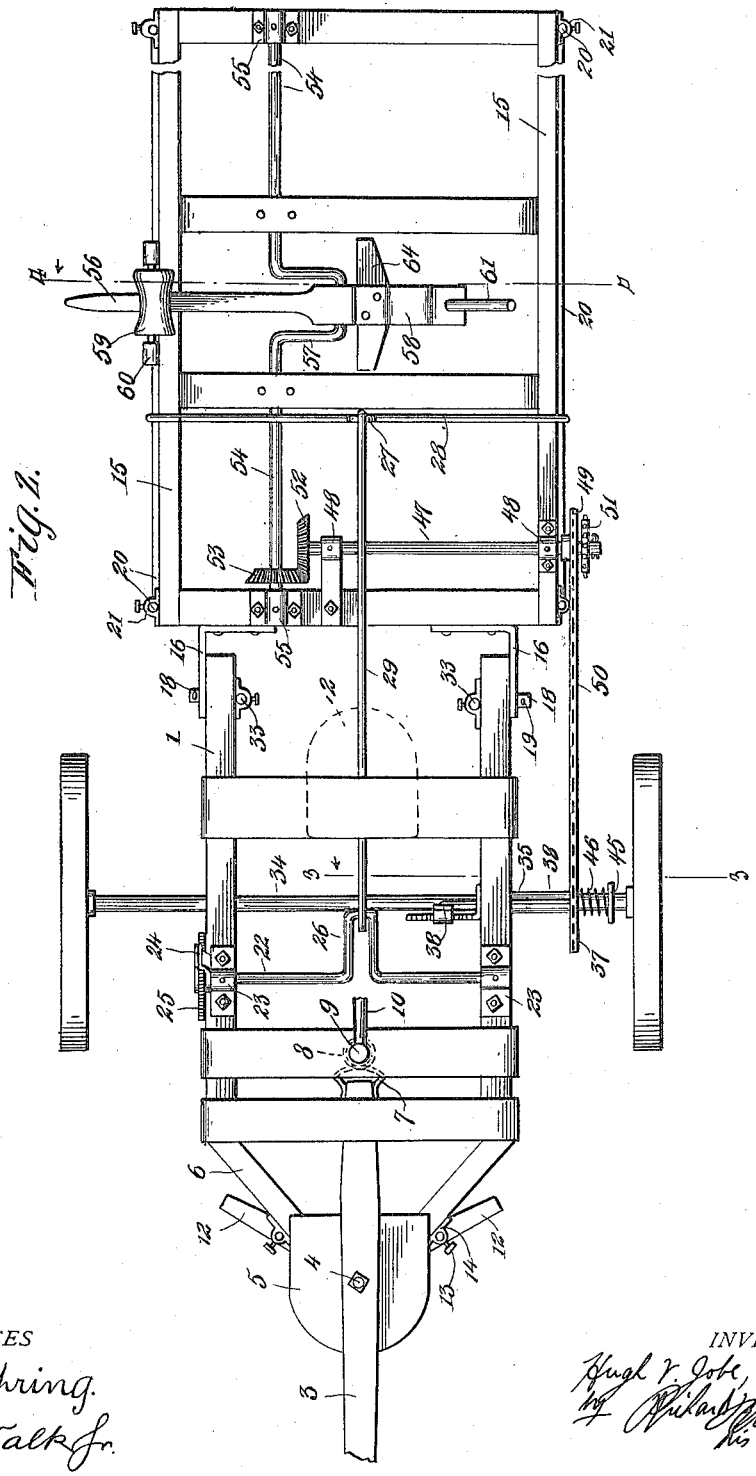

UNITED STATES PATENT OFFICE.

HUGH V. JOBE, OF ROLL, OKLAHOMA.

COTTON-CHOPPING MACHINE.

1,135,287.   Specification of Letters Patent.   Patented Apr. 13, 1915.

Application filed March 17, 1913. Serial No. 754,879.

*To all whom it may concern:*

Be it known that I, HUGH V. JOBE, citizen of the United States, residing at Roll, in the county of Roger Mills and State of Oklahoma, have invented certain new and useful Improvements in Cotton-Chopping Machines, of which the following is a specification.

This invention relates to cotton chopping machines and the purpose thereof is to provide an implement of novel structure, particularly adapted for thinning rows of cotton plants, and embodies mechanism for destroying the weeds and other plants of a like nature growing between the said rows.

A further object of the invention contemplates the provision of an improved cotton chopping machine which is well adapted to chop the young cotton plants, and which is provided with scrapers of the disk or plate variety, for working in front of the chopper, to destroy weeds and the like, and carry the same to either side, thus leaving the cotton in a narrow space and in condition to be subsequently chopped by a suitable reciprocatory blade carried by the machine.

A still further object of the invention resides in the provision of means for intermittently operating or moving the chopping blade across the row of growing cotton.

A further object of the invention is to provide means for elevating the blade above the row of plants in a position incapable of chopping operation, this being accomplished without stopping the reciprocatory movement thereof, or in any way effecting the progress of the machine.

Another object of the invention is to provide means for guiding or controlling the direction of travel of the machine from the operator's seat.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of a machine constructed in accordance with my invention. Fig. 2 is a top plan view of the machine. Fig. 3 is a section on line 3—3 of Fig. 2, and Fig. 4 is a section on line 4—4 of Fig. 2.

Proceeding now to the description of the drawings, wherein is illustrated the preferred form of my invention, the numeral 1 designates a wheeled-frame or the main frame of the machine upon which is conveniently mounted, an operator's seat 2 of the ordinary type and a tongue 3. The said tongue 3 is pivotally mounted as at 4 upon a suitable plate 5, the said plate being supported upon the converged or tapered end 6 of the frame. The rear extremity of the tongue 3 is provided with a segmental rack 7 adapted to mesh with a pinion 8 keyed or otherwise secured upon the lower extremity of a vertically extending rod 9, the said rod being supported directly in front of the operator's seat and provided with a handle 10 by means of which the same may be rotated. Any suitable means such as an arched supporting plate 11 carried by the main frame 1 may be employed for the purpose of supporting the said rod 9. By operating the handle 10, it will be seen that the rod 9 is turned and the tongue 3 swung upon its pivot which operation is adapted to guide the machine as desired over the row of cotton plants to be chopped, and that the direction of travel may be shifted or varied by simply swinging the handle 10 in either direction.

Scrapers 12 are adjustably mounted by means of a thumb-screw 13 within suitable castings 14 secured, one upon each of the tapering frame portions 6, the said scrapers being preferably set on an incline to the horizontal, and worked upon either side of the row of cotton to thoroughly scrape and clean between the rows, thereby removing all weeds or similar undesirable plants.

A second or supplementary frame 15 is pivotally mounted upon the rear extremity of the main frame 3 by means of a pair of L-shaped brackets 16 having an elongated aperture 17 formed therein, pins 18 or the main frame are adapted to extend through the said apertures for pivotally and adjustably mounting the said supplementary frame 15. Any suitable means such as a cotter pin 19 may be employed for the purpose of detachably supporting the said brackets upon the said pins. Runners 20 of the ordinary type are adjustably mounted upon each side of the supplementary frame 15 through the medium of suitable brackets or casters 21, this construction allowing the said frame to be supported during operation in either raised or lower position as desired. When it is desired that the said supplementary frame should be raised out of operative position, the same is accomplished by means of a crank shaft 22 journaled within bearings 23 secured to the main frame of the machine near the forward end thereof and controlled by a suitable hand lever 24 operated in connection with a quadrant secured to one of the said frame sides. An offset portion 26 of the said crank shaft is connected to another offset portion 27 formed upon a cross bar 28 by means of a connecting bar or rod 29, the said bar 28 being fixedly secured to the supplementary frame at a point near the center thereof. The operation of the lever 24, which is keyed or otherwise secured rigidly upon the crank shaft 22 will cause the latter to turn, thus raising the offset portion 26, which in turn raises the entire rear or supplementary frame 15, the same being swung upon the pins 18 by reason of the brackets 16 affording such pivotal connection.

Caster wheels 30 are revolubly mounted as at 31 upon the lower extremity of a depending arm 32, the said arm being adjustably mounted in a suitable caster 33 provided for that purpose and secured upon the rear inner face of the frame sides 1. The said wheels 30 are normally out of engagement with the ground, but upon raising the supplementary frame by the operation of the lever 24, the rear end of the main frame 1 is tilted, thereby bringing the said wheels 30 into engagement with the ground, the said wheels supporting the main frame as desired.

Having described in detail the construction of the machine, the manner in which the chopping operation is accomplished will now be described. The main or wheel shaft 34 upon which the supporting wheels of the machine are mounted is provided near one end thereof with an enlargement 35, one face of which is provided with teeth 36, the purpose of which will subsequently appear. Slidably and loosely mounted upon the said main shaft 34 adjacent the enlargement 35 I provide a sprocket wheel 37 having a sleeve 38 formed integrally therewith and projecting from one face thereof, the said sleeve terminating at one end in a toothed face 39 adapted to register or mesh with the toothed face 36 of the enlargement when the said sprocket is slid upon the said shaft sufficiently to bring the two faces together. The means employed for sliding the sprocket 37 comprises a suitable lever 38 pivoted as at 39 upon a bracket 40, the said bracket having a quadrant or rack 41 formed thereupon and secured as at 42 to one of the frame sides 1 of the machine. A rod 43 is secured at one end to the sprocket 37 and at its opposite end as at 44 to the lower extremity of the said lever, thereby allowing the sprocket to be freely shifted or slid upon the shaft 34 according to the movement of the said lever 38. A flange 45 is formed upon the said shaft 34 near the end thereof upon the inner face of which a suitable expansion spring 46 is secured, the said spring being disposed upon the shaft and engaging the outer face of the sprocket 37 for normally forcing the said sprocket laterally upon the shaft during the manipulation or movement of the said hand lever 38. A smaller shaft 47 is journaled within suitable bearings 48 secured to the forward end of the rear or supplementary frame 15, the said shaft 47 extending parallel with the main shaft 34 and having keyed or otherwise fixedly secured at one end thereof a sprocket wheel 49 which is connected to the sprocket wheel 37 by means of a suitable sprocket chain 50, the said chain being adapted to impart movement from the main shaft 34 to the said smaller shaft 47 of the rear frame. Another spocket 51 may be secured to the said shaft 47 adjacent the sprocket 49, the sprocket 51 being smaller than the sprocket 49, whereupon a faster rotation of the shaft is generated by shifting the chain 50 from the larger to the smaller of the sprockets. The opposite end of the small shaft terminates in a bevel gear 52 in mesh with a pinion 53 rigidly mounted upon a longitudinally extending crank shaft 54 journaled within suitable brackets 55 and supported by the rear or supplementary frame 15. An arm 56 is loosely mounted upon the offset portion 57 of the crank shaft 54 by means of a specially constructed bracket or casting 58, the said arm 56 being held in the desired position by means of a roller 59 beneath which it passes, the said roller being supported through the medium of a pair of vertically extending arms 60. By the disposition of the arm 56 beneath the roller it will be recognized that the arm 56 is at all times held in operative position and will allow the blade supporting rod 61 which is secured to the inner end thereof by means of the bracket 58 to be freely reciprocated by the rotation of the crank shaft 54. A cuff 62 is formed upon the bracket 58 provided with a set screw 63 for adjustably mounting the rod 61 within the said bracket, the said rod 61 having a cutting blade 64 secured upon the lower extremity thereof, the said blade being reciprocated in the desired manner by the movement of the arm 56 and shaft 54.

It will be seen from the above, taken in connection with the accompanying drawings that the power necessary for operating the reciprocatory blade 64 is generated by the forward movement of the machine and entirely controlled by the rotation of the main shaft 34 upon which the supporting wheels are mounted, the said wheels being rigidly mounted upon the said shaft to rotate the latter by the movement of the machine; that the disposition of the several hand levers is such as to permit convenient operation thereof by the operator from his seat; and that the rear or supplementary frame may be raised or lifted into an inoperative position without stopping or otherwise impeding the progress of the machine.

Attention is also called to the novel and peculiar manner in which the machine is guided or controlled by the operation of the handle 10, and to the means employed for supporting the cutting or chopping blade 64 in a vertical position capable of cutting crosswise the row over which the machine is traveling.

It will be understood that the above description and accompanying drawings comprehend only the general and preferred embodiment of my invention and that various minor changes in the details of construction, proportion and arrangement of parts may be made within the scope of the appended claims and without sacrificing any of the advantages of my invention.

Having thus fully described my invention, what I claim as new and desire to secure by Letters Patent, is:—

1. A cotton chopping machine including a main frame, a supplementary frame, brackets secured thereto, the said brackets each being provided with an elongated slot, means carried by the said main frame adapted to extend through the said slots to provide for pivotal movement of the said supplementary frame and for slight longitudinal movement thereof independent of the said main frame, and means including a pair of vertically adjustable runners detachably secured to the said supplementary frame whereby the said frame may be adjusted vertically independent of the said main frame.

2. In combination with a cotton chopping machine, an operating crank shaft, a reciprocatory arm loosely connected to the offset in the said crank shaft, a bracket mounted upon one end of the said arm, a vertically adjustable blade supporting member carried by the said bracket, and guide means including an independently mounted roller arranged over the said arm to normally maintain the said arm at an inclination with respect to the machine, as and for the purpose set forth.

3. A cotton chopping machine including a wheeled main frame, a sprocket wheel loosely mounted upon the main shaft of the said wheel frame, clutch mechanism carried by the main frame for rotating the said sprocket wheel according to the rotation of the said shaft, a rear supplementary frame pivotally and detachably secured to the said main frame, a shaft journaled within bearings secured to the said supplementary frame, means connecting the said sprocket wheel to the said last mentioned shaft for imparting movement thereto according to the rotation of the said sprocket, a reciprocatory cutting blade carried by the said supplementary frame, means including a plurality of gears and shafts for operating the said blade, and means carried by the main frame for elevating the rear frame and lifting the said blade out of operative position.

4. A cotton chopping machine including a wheeled main frame, a sprocket wheel loosely mounted upon one end of the main shaft of said frame, clutch mechanism carried by said frame for rotating the said wheel according to the rotation of the said shaft, a second shaft mounted upon the rear frame and extending parallel with the main shaft of the machine, means for connecting the said second mentioned shaft to the said wheel for operating the former according to the rotation of the main shaft, a crank shaft carried by the said supplementary frame, the rotation of which is controlled by the movement of the said second mentioned shaft, and means including a crank shaft carried by the main frame and connected to the supplementary frame for elevating the latter and lifting the reciprocatory blade out of operative position.

5. In combination with a cotton chopping machine comprising a main frame, a supplementary frame, and means for swinging the said supplementary frame into and out of operative position, of an operating crank shaft carried by the said supplementary frame, means for driving the said crank shaft during the forward movement of the said main frame, an operating arm loosely connected to the offset in the said crank shaft, a bracket at one end of the said arm, a vertically adjustable blade carrying member supported by the said bracket, and a roller disposed at one side of the said supplementary frame and over the said arm to provide a stop therefor and to maintain the said arm normally at an inclination with respect to the said supplementary frame, as and for the purpose set forth.

6. In a cotton chopping machine, the combination of a main frame, a main shaft having wheels secured upon each end thereof upon which the said frame is supported, a sprocket wheel loosely mounted upon the said main shaft, spring controlled clutch mechanism for rotating the said sprocket wheel according to the rotation of the said shaft and means carried by the said frame for operating the said clutch mechanism, of a supplementary frame pivotally connected to the rear end of said main frame, a shaft journaled within bearings secured to the said supplementary frame, means for connecting the said shaft to the said sprocket wheel for imparting movement to the said shaft, a crank shaft carried by the said supplementary frame, bevel gears for rotating the said crank shaft according to the movement of the said second mentioned shaft, and means including a reciprocatory blade carried by the said crank shaft for effecting the chopping operation.

7. In a cotton chopping machine, the combination of a main frame, a main shaft having wheels mounted upon each end thereof for supporting the said frame, a sprocket wheel loosely mounted upon the said shaft, clutch mechanism carried by said frame for rotating the said wheel according to the movement of said shaft, and means including a hand lever carried by said frame for operating the said clutch mechanism, of a supplementary frame pivotally mounted to the rear end of said frame, runners adjustably mounted upon said supplementary frame for supporting the same, a crank shaft carried by said frame, means including a plurality of gears and shafts for rotating the said crank shaft according to the movement of said sprocket wheel, a reciprocatory blade carried by said crank shaft and means including a crank shaft carried by the said main frame and connecting the supplementary frame for elevating the latter for lifting the said blade out of operative position.

In testimony whereof I affix my signature in presence of two witnesses.

HUGH V. JOBE.

Witnesses:
A. FALCONER,
D. N. HUNT.

Copies of this patent may be obtained for five cents each, by addressing the "Commissioner of Patents, Washington, D. C."